(12) United States Patent
Kwon et al.

(10) Patent No.: US 10,069,119 B2
(45) Date of Patent: Sep. 4, 2018

(54) SECONDARY BATTERY

(71) Applicant: Samsung SDI Co., Ltd., Yongin-si, Gyeonggi-do (KR)

(72) Inventors: Doyeon Kwon, Yongin-si (KR); Daeyon Moon, Yongin-si (KR); Sanghyuk Eo, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 89 days.

(21) Appl. No.: 14/947,990

(22) Filed: Nov. 20, 2015

(65) Prior Publication Data

US 2016/0156002 A1 Jun. 2, 2016

(30) Foreign Application Priority Data

Nov. 28, 2014 (KR) .................... 10-2014-0169174

(51) Int. Cl.
| | |
|---|---|
| *H01M 2/06* | (2006.01) |
| *H01M 2/26* | (2006.01) |
| *H01M 2/04* | (2006.01) |
| *H01M 10/48* | (2006.01) |
| *H01M 2/20* | (2006.01) |

(52) U.S. Cl.
CPC ........... *H01M 2/06* (2013.01); *H01M 2/0469* (2013.01); *H01M 2/204* (2013.01); *H01M 10/486* (2013.01); *H01M 2/0404* (2013.01); *H01M 2220/30* (2013.01)

(58) Field of Classification Search
CPC ..... H01M 2/06; H01M 2/0404; H01M 2/0469
See application file for complete search history.

(56) References Cited

U.S. PATENT DOCUMENTS

| | | | |
|---|---|---|---|
| 8,557,432 B2 | 10/2013 | Jung et al. | |
| 2003/0170530 A1 | 9/2003 | Nishimura et al. | |
| 2009/0130550 A1* | 5/2009 | Kim ................... | H01M 2/0404 429/163 |

(Continued)

FOREIGN PATENT DOCUMENTS

| | | |
|---|---|---|
| JP | 2003-197165 A | 7/2003 |
| JP | 2004-327341 A | 11/2004 |

(Continued)

OTHER PUBLICATIONS

Korean Office Action dated Sep. 18, 2015 for Korean Patent Application No. KR 10-2014-0169174 which corresponds to subject U.S. Appl. No. 14/947,990.

(Continued)

*Primary Examiner* — Osei K Amponsah
(74) *Attorney, Agent, or Firm* — Knobbe Martens Olson & Bear LLP

(57) ABSTRACT

A secondary battery is disclosed. In one aspect, a secondary battery includes a battery cell including an electrode, a cap cover placed over the battery cell and having an opening that exposes the electrode and a connection member placed over the cap cover and electrically connected to the electrode. The secondary battery also includes a protrusion extending upwardly from the cap cover and contacting the connection member, wherein a gap is formed between the cap cover and the connection member.

19 Claims, 6 Drawing Sheets

(56) References Cited

U.S. PATENT DOCUMENTS

| | | | | |
|---|---|---|---|---|
| 2010/0086845 A1* | 4/2010 | Jung | ............ | H01M 2/0215 |
| | | | | 429/178 |
| 2011/0039129 A1* | 2/2011 | Lee | ............ | H01M 2/0404 |
| | | | | 429/7 |
| 2014/0072847 A1* | 3/2014 | Moon | ............ | H01M 2/204 |
| | | | | 429/90 |
| 2014/0072858 A1 | 3/2014 | Won et al. | | |
| 2014/0220414 A1 | 8/2014 | Lee et al. | | |

FOREIGN PATENT DOCUMENTS

| | | | | |
|---|---|---|---|---|
| JP | 2006-012657 | * | 1/2006 | ......... H01M 2/10 |
| JP | 2006-012657 A | | 1/2006 | |
| JP | 2014-056809 A | | 3/2014 | |
| KR | 10-0821857 B1 | | 4/2008 | |
| KR | 10-2014-0034390 A | | 3/2014 | |
| KR | 10-2014-0099398 A | | 8/2014 | |

OTHER PUBLICATIONS

Korean Office Action dated Mar. 30, 2016 for Korean Patent Application No. KR 10-2014-0169174 which corresponds to subject U.S. Appl. No. 14/947,990.

* cited by examiner

SECONDARY BATTERY

INCORPORATION BY REFERENCE TO ANY PRIORITY APPLICATIONS

This application claims the benefit of Korean Patent Application No. 10-2014-0169174, filed on Nov. 28, 2014, in the Korean Intellectual Property Office, the disclosure of which is incorporated herein in its entirety by reference.

BACKGROUND

Field

The described technology generally relates to a secondary battery.

Description of the Related Technology

With the advent of wireless Internet and communication technology, there has been increased use of electronic devices such as cellular phones or portable computers equipped with secondary, or rechargeable, batteries. These devices can be used anywhere without the need for constant access to power outlets.

SUMMARY OF CERTAIN INVENTIVE ASPECTS

One inventive aspect is a secondary battery in which a connection member that is electrically connected to a battery cell is protected from damage.

Another aspect is a secondary battery that includes: a battery cell including an electrode; a cap cover placed on the battery cell and including an opening that exposes the electrode; a connection member placed on the cap cover and electrically connected to the electrode; and a protrusion protruding upward from the cap cover for supporting the connection member above the cap cover.

The protrusion can include first and second protrusions that are separate from each other in a length direction of the connection member.

The secondary battery can further include a case accommodating the battery cell, the cap cover, and the connection member, wherein an assembling rib protruding from the case can be inserted between the first and second protrusions.

The assembling rib can be inserted in a space formed between the connection member and the cap cover by the first and second protrusions.

The electrode can include first and second electrodes formed on an upper surface of the battery cell and having different polarities.

The connection member can include first and second connection members electrically connected to the first and second electrodes, respectively.

The protrusion can support at least one of the first and second connection members.

The first and second connection members can overlap each other and extend in parallel with each other.

The opening can include first and second openings through which the first and second electrodes are respectively exposed.

The protrusion can include: a first protrusion formed between the first and second openings; and a second protrusion formed between the second opening and an end portion of the cap cover.

The first protrusion can support the first connection member electrically connected to the first electrode exposed through the first opening, and the second protrusion can support the second connection member electrically connected to the second electrode exposed through the second opening.

The second protrusion can support the second connection member and the first connection member placed on top of the first connection member in an overlapping manner.

The secondary battery can further include a case accommodating the battery cell, the cap cover, and the connection member, wherein an assembling rib protruding from the case can be inserted between the first and second protrusions.

The assembling rib can be inserted in a space formed between the first connection member and the cap cover by the first and second protrusions.

A temperature-sensing element can be placed between the first electrode and the first connection member, and the cap cover can further include a third opening that exposes the temperature-sensing element.

Another aspect is a secondary battery comprising a battery cell including an electrode, a cap cover placed over the battery cell and having an opening that exposes the electrode, a connection member placed over the cap cover and electrically connected to the electrode, and a protrusion extending upwardly from the cap cover and contacting the connection member, wherein a gap is formed between the cap cover and the connection member.

In the above secondary battery, the protrusion comprises first and second protrusions separated from each other in a length direction of the connection member.

The above secondary battery further comprises i) a case accommodating the battery cell, the cap cover, and the connection member and ii) an assembling rib protruding from the case and positioned between the first and second protrusions.

In the above secondary battery, the assembling rib is positioned in a space defined by the connection member, the cap cover and the first and second protrusions.

In the above secondary battery, the battery cell has an upper surface, wherein the electrode comprises first and second electrodes formed over the upper surface of the battery cell and having different polarities.

In the above secondary battery, the connection member comprises first and second connection members electrically connected to the first and second electrodes, respectively.

In the above secondary battery, the protrusion contacts at least one of the first and second connection members.

In the above secondary battery, the first and second connection members at least partially overlap each other and extend in the length direction of the cap cover.

In the above secondary battery, the opening comprises first and second openings that respectively expose the first and second electrodes.

In the above secondary battery, the cap cover has an end portion, and wherein the protrusion comprises: a first protrusion formed between the first and second openings and a second protrusion formed between the second opening and the end portion of the cap cover.

In the above secondary battery, the first protrusion contacts the first connection member electrically connected to the first electrode exposed through the first opening, wherein the second protrusion contacts the second connection member electrically connected to the second electrode exposed through the second opening.

In the above secondary battery, the second protrusion further supports a portion of the first connection member overlapping the second connection member.

The above secondary battery further comprises i) a case accommodating the battery cell, the cap cover, and the connection member ii) an assembling rib protruding from the case positioned between the first and second protrusions.

In the above secondary battery, the assembling rib is positioned in a space defined by the first connection member, the cap cover and the first and second protrusions.

The above secondary battery further comprises a temperature sensor placed between the first electrode and the first connection member, wherein the cap cover further comprises a third opening that exposes the temperature sensor.

In the above secondary battery, the first protrusion has a top portion and slanted sides that are inclined with respect to the top portion of the first protrusion and a top portion of the cap cover.

Another aspect is a secondary battery comprising a battery cell including an electrode and a cap cover placed over the battery cell and having an opening that exposes the electrode, wherein the cap cover includes a body portion and a plurality of protrusions protruding upwardly from the body portion, and wherein the protrusions include a first protrusion and a second protrusion longer than the first protrusion. The secondary battery also comprises a connection member placed over the cap cover and electrically connected to the electrode, wherein the protrusions contact the connection member.

In the above secondary battery, a gap is formed between the cap cover and the connection member.

In the above secondary battery, the battery cell includes two battery cells electrically connected to each other, wherein the connection member includes first and second connection members at least partially overlapping each other.

In the above secondary battery, a vertical gap is formed between the first and second connection members.

DETAILED DESCRIPTION OF CERTAIN INVENTIVE EMBODIMENTS

Figure 1:
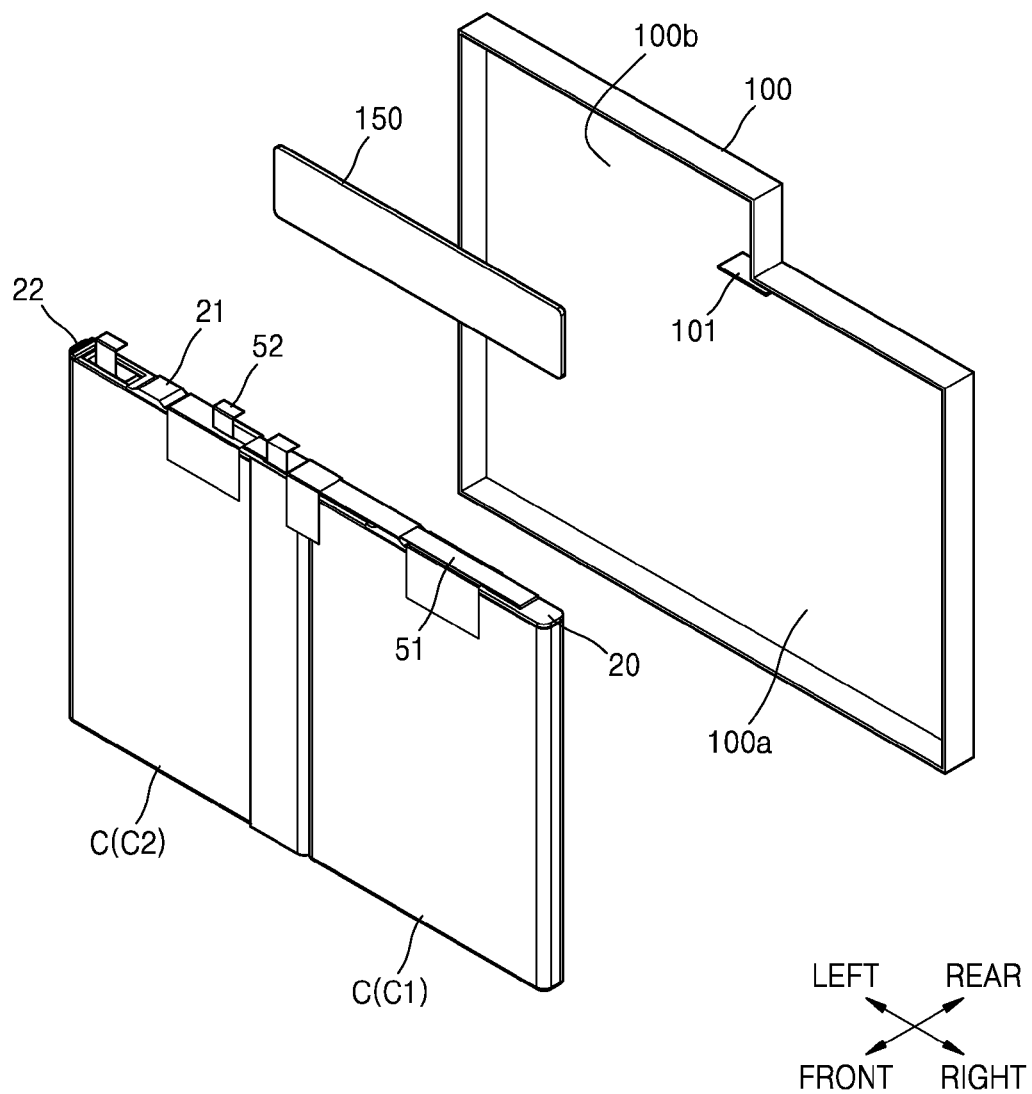
FIG. 1 is a perspective view illustrating a secondary battery according to an exemplary embodiment.

Reference will now be made in detail to exemplary embodiments, examples of which are illustrated in the accompanying drawings, wherein like reference numerals refer to like elements throughout. In this regard, the present exemplary embodiments can have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Secondary batteries will now be described in detail with reference to the accompanying drawings, in which exemplary embodiments are shown. In this disclosure, the term "substantially" includes the meanings of completely, almost completely or to any significant degree under some applications and in accordance with those skilled in the art. Moreover, "formed on" can also mean "formed over." The term "connected" can include an electrical connection.

FIG. 1 is a perspective view illustrating a secondary battery according to an exemplary embodiment.

Referring to FIG. 1, the secondary battery includes first and second battery cells C1 and C2 and at least one connection member. The connection member can include first and second connection members 51 and 52 forming a charging and discharging current path of the first and second battery cells C1 and C2. The secondary battery can include a protective circuit 150 electrically connected to the connection members 51 and 52, and a case 100 accommodating the first and second battery cells C1 and C2 and the protective circuit 150.

In some embodiments, the first and second battery cells C1 and C2 have substantially the same structure. In the present disclosure, the term "battery cell C" can refer to one of the first and second battery cells C1 and C2. However, the following description will be presented based on the first battery cell C1 for convenience, and the term "battery cell C" refers to the first battery cell C1 unless otherwise mentioned.

For example, an electrode of the battery cell C is an electrode of one of the first and second battery cells C1 and C2. However, in the following description, an electrode of the battery cell C is assumed to be an electrode of the first battery cell C1 unless otherwise mentioned.

The case 100 can include a cell accommodation portion 100a accommodating the battery cell C and a circuit accommodation portion 100b accommodating the protective circuit 150. The protective circuit 150 is electrically connected to the battery cell C through the connection members 51 and 52 for controlling charging and discharging operations of the battery cell C. An assembling rib 101 can be formed between the cell accommodation portion 100a and the circuit accommodation portion 100b. The assembling rib 101 can protrude from the case 100 toward the battery cell C so as to restrict an assembling position of the battery cell C.

Figure 2:
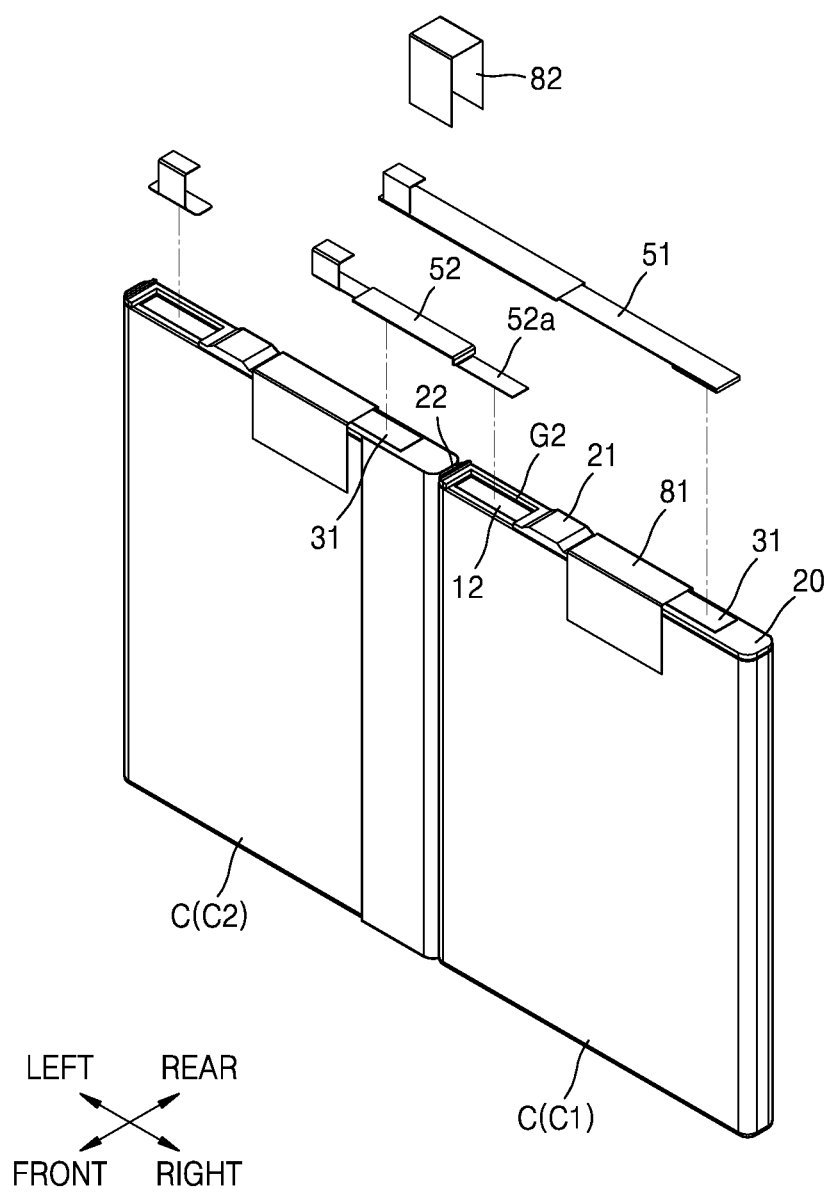
FIG. 2 is an exploded perspective view illustrating parts of the secondary battery illustrated in FIG. 1.
Figure 3:
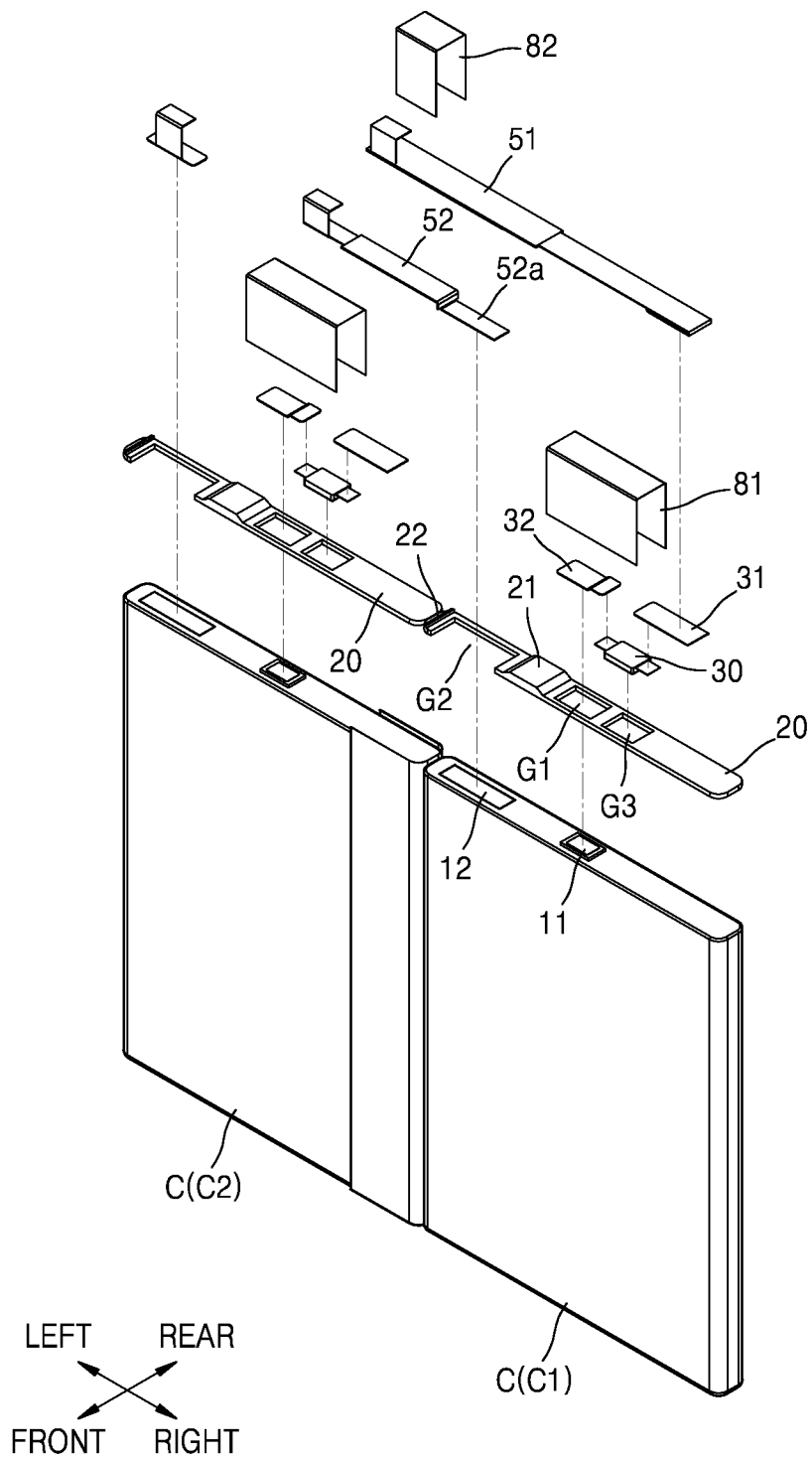
FIG. 3 is an exploded perspective view illustrating the portions of the secondary battery illustrated in FIG. 2.
Figure 4A:
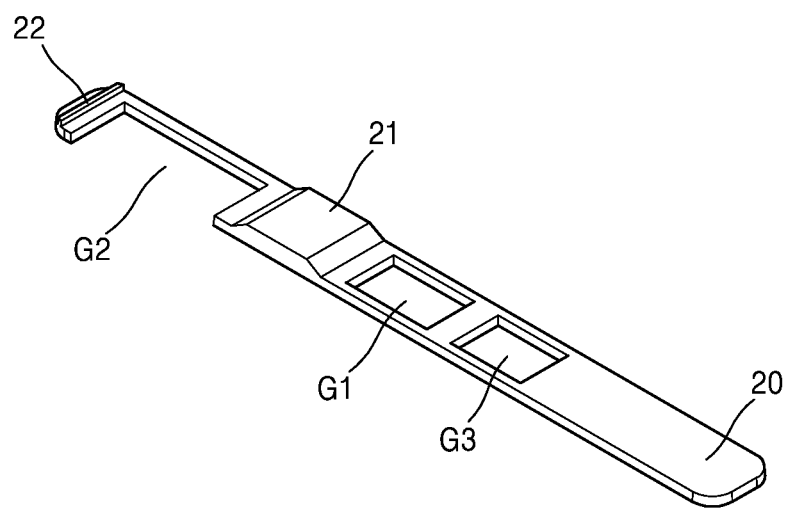
FIGS. 4A and 4B respectively illustrate a perspective view and a side view of a cap cover illustrated in FIG. 3.
Figure 4B:

FIG. 2 is an exploded perspective view illustrating portions of the secondary battery illustrated in FIG. 1. FIG. 3 is an exploded perspective view illustrating the portions of the secondary battery illustrated in FIG. 2. FIGS. 4A and 4B respectively illustrate a perspective view and a side view of a cap cover 20 illustrated in FIG. 3.

Referring to FIG. 2, the secondary battery includes the battery cell C including electrodes 11 and 12 and the cap cover 20 placed on the battery cell C and including first and second openings G1 and G2 through which the electrodes 11 and 12 are exposed. The connection members 51 and 52 are placed on the cap cover 20 and electrically connected to the electrodes 11 and 12. In addition, the secondary battery further includes at least one protrusion. The protrusion can include first and second protrusions 21 and 22 protruding upward from the cap cover 20 to support the connection members 51 and 52 above the cap cover 20.

The protrusions 21 and 22 can support the connection members 51 and 52 above the cap cover 20. The protrusions 21 and 22 can protrude upwardly from the cap cover 20. That is, a gap can be formed between the cap cover 20 and the connection members 51 and 52 supported on the protrusions 21 and 22. The gap formed between the cap cover 20 and the connection members 51 and 52 by the protrusions 21 and 22 can function as a space for preventing damage to the connection members 51 and 52 and receiving the assembling rib 101.

The protrusions 21 and 22 can be formed along substantially the entire width of the cap cover 20 to stably support the connection members 51 and 52. The protrusions 21 and 22 can include first and second protrusions 21 and 22 separated from each other in a length direction of the connection members 51 and 52. The first and second protrusions 21 22 can be separated from each other by a predetermined length in a left-to-right direction in which the connection members 51 and 52 extend.

The first and second protrusions 21 and 22 can support first and second connection members 51 and 52, and one of the first and second protrusions 21 and 22 can support both the first and second connection members 51 and 52. For example, one of the first and second connection members 51 and 52, which is longer than the other, is supported by both the first and second protrusions 21 and 22 that are formed at different positions.

The connection members 51 and 52 can include the first and second connection members 51 and 52 electrically connected to first and second electrodes 11 and 12 of the battery cell C, respectively. The first and second connection members 51 and 52 can connect the battery cell C to the protective circuit 150 for forming the charging and discharging current path. For example, ends of the first and second connection members 51 and 52 are placed close to the first and second electrodes 11 and 12 of the battery cell C for direct or indirect connection with the first and second electrodes 11 and 12. In this example, the other ends of the first and second connection members 51 and 52 are connected to the protective circuit 150. The first and second connection members 51 and 52 can overlap each other on the cap cover 20 and can extend in substantially parallel alignment with each other.

In the exemplary embodiment shown in FIG. 2, the first and second connection members 51 and 52 extend outwardly from the battery cell C. That is, the first and second connection members 51 and 52 electrically connected to the first battery cell C1 extend from the first battery cell C1 to the second battery cell C2. However, the present disclosure is not limited thereto. For example, according to the position of the protective circuit 150, the second connection member 52 extends outwardly from the battery cell C, but the first connection member 51 does not extend outwardly from the battery cell C. That is, the lengths of the first and second connection members 51 and 52 can vary according to positions at which the first and second connection members 51 and 52 are connected to the protective circuit 150.

Referring to FIG. 2, the secondary battery includes the first and second battery cells C1 and C2 neighboring each other, and the first and second battery cells C1 and C2 are electrically connected to each other through the connection members 51 and 52. For example, neighboring battery cells C are connected in series or parallel by electrically connecting connection members 51 and 52 extending from a battery cell C to electrodes 11 and 12 of another battery cell C.

For example, one of the first and second connection members 51 and 52 of the first battery cell C1 extends toward the second battery cell C2 and is electrically connected to a lead terminal 31 connected to the first electrode 11 of the second battery cell C2. In this case, the second connection member 52 can connect the second electrode 12 of the first battery cell C1 to the lead terminal 31 connected to the first electrode 11 of the second battery cell C2. That is, the second connection member 52 can connect different electrodes of the first and second battery cells C1 and C2 so as to connect the first and second battery cells C1 and C2 together in series.

In FIG. 2, the secondary battery includes two battery cells C. However, the present disclosure is not limited thereto. That is, in other exemplary embodiments, a secondary battery includes only one battery cell C, or three or more battery cells C.

Referring to FIG. 3, the first connection member 51 is electrically connected to the first electrode 11 through a temperature-sensing element or temperature sensor 30. The temperature-sensing element 30 can be placed between the first electrode 11 and the first connection member 51 to form the charging and discharging current path.

Lead terminals 31 and 32 can be placed on both ends of the temperature-sensing element 30. For example, the lead terminal 32 is electrically connected to the first electrode 11 exposed upwardly through the first opening G1. The lead terminal 31 can be connected to the first connection member 51.

A third opening G3 can be formed through the cap cover 20 to expose the temperature-sensing element 30. The temperature-sensing element 30 can be placed close to the battery cell C so as to precisely measure the temperature of the battery cell C. To this end, the third opening G3 can be formed through the cap cover 20 to expose the temperature-sensing element 30 to a surface of the battery cell C.

The first and second openings G1 and G2 can be formed through the cap cover 20 to respectively expose the first and second electrodes 11 and 12. The first and second electrodes 11 and 12 exposed through the first and second openings G1 and G2 can be respectively connected to the first and second connection members 51 and 52. In addition, the third opening G3 can be formed through the cap cover 20 to expose the temperature-sensing element 30.

The formation positions of the protrusions 21 and 22 will now be described in more detail. The first protrusion 21 can be formed between the first and second openings G1 and G2. For example, the first protrusion 21 supports the first connection member 51 electrically connected to the first electrode 11 exposed through the first opening G1. For example, the first connection member 51 is electrically connected to the first electrode 11 through the temperature-sensing element 30, and the first protrusion 21 upwardly supports the first connection member 51 extending from the temperature-sensing element 30.

The second protrusion 22 can be formed between the second opening G2 and an end portion of the cap cover 20. As shown in FIG. 3, the second protrusion 22 is formed adjacent to the end portion of the cap cover 20.

The second protrusion 22 can support the second connection member 52. For example, the second connection member 52 extends from the second electrode 12 exposed through the second opening G2 to the end portion of the cap cover 20, and the second protrusion 22 formed between the second opening G2 and the end portion of the cap cover 20 upwardly supports the second connection member 52.

The second protrusion 22 can be formed on the end portion of the cap cover 20 and support the second connection member 52 and the first connection member 51. For example, the first connection member 51 extends from the temperature-sensing element 30 to the outside of the battery cell C through the end portion of the cap cover 20. The second protrusion 22 formed on the end portion of the cap cover 20 can support the first connection member 51. For example, the first connection member 51 is placed on top of the second connection member 52 in an overlapping manner and can be supported by the second protrusion 22.

In the exemplary embodiment, the protrusions 21 and 22 support the connection members 51 and 52 above the cap cover 20. The protrusions 21 and 22 separate the connection members 51 and 52 from a surrounding structure, and thus the connection members 51 and 52 can be protected without physical damage. For example, owing to the protrusions 21 and 22, the connection members 51 and 52 are protected from sharp shapes such as cutting edges, cutting burrs, or welding burrs of the temperature-sensing element 30 or the lead terminals 31 and 32.

In the exemplary embodiment, the battery cell C and the first and second connection members 51 and 52 are electrically connected to each other by performing a thermal joining process such as welding on a plurality of positions. In some embodiments, to electrically connect the first electrode 11 to the first connection member 51 through the temperature-sensing element 30, the lead terminal 32 placed on an end of the temperature-sensing element 30 is welded to the first electrode 11, or the lead terminal 31 placed on the end of the temperature-sensing element 30 is welded to the first connection member 51. In addition, the second electrode 12 and the second connection member 52 can be connected together by a thermal joining process such as welding.

For example, welding burrs are formed on a leg 52a of the second connection member 52 facing the second electrode 12, and in this case, the first connection member 51 extending above the second connection member 52 can be damaged by the welding burrs. However, in some embodiments, since the first connection member 51 is supported at upper positions by the first and second protrusions 21 and 22, the first connection member 51 is separated from the leg 52a of the second connection member 52 and thus not damaged by welding burrs formed on the leg 52a.

The leg 52a bent downward from the second connection member 52 can be connected to the second electrode 12, and the second connection member 52 can extend from the second electrode 12 and be supported at an upper position by the second protrusion 22. The second protrusion 22 can support the second connection member 52 and the first connection member 51 placed on the second connection member 52.

Referring to FIG. 3, first and second insulation tape pieces 81 and 82 are shown. For example, the first insulation tape piece 81 is used to fix the temperature-sensing element 30 to the battery cell C and insulate the temperature-sensing element 30 from the connection members 51 and 52. The second insulation tape piece 82 can be used to fix the connection members 51 and 52 and insulate the connection members 51 and 52 from external parts.

In some embodiments, as shown in FIG. 4B, the protrusions 21 and 22 protruding from the cap cover 20 have substantially the same height. For example, the first connection member 51 is supported by both the first and second protrusions 21 and 22. In this case, the first connection member 51 can be horizontally supported by the first and second protrusions 21 and 22 having the same height.

Figure 5:
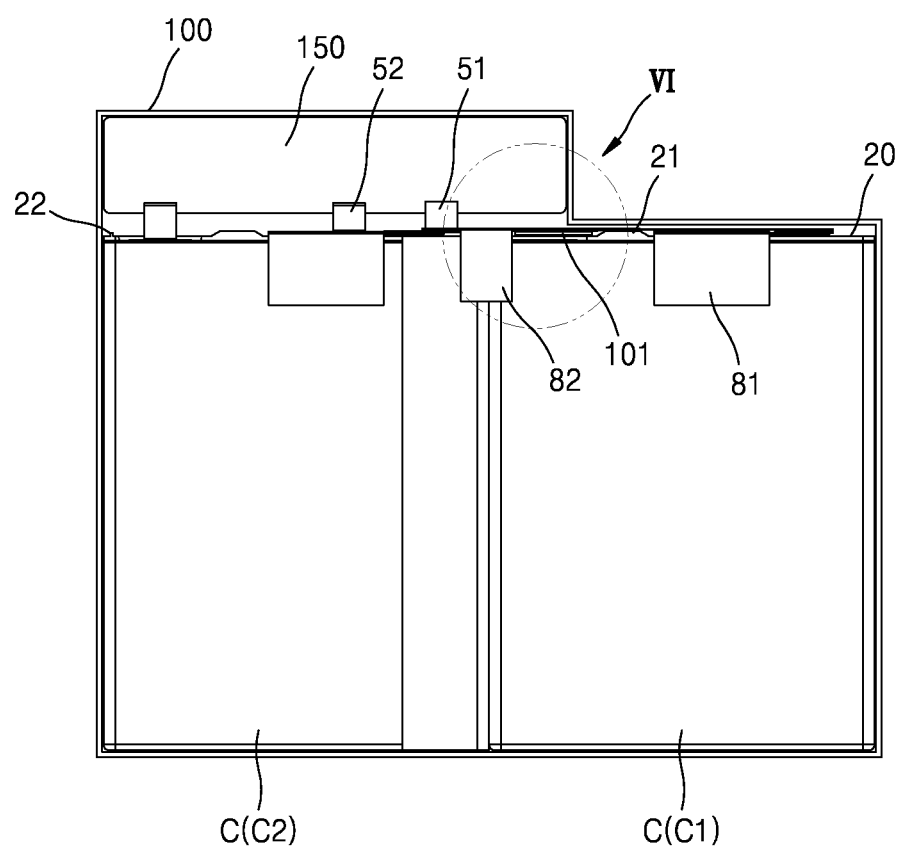
FIG. 5 is a view illustrating an assembled state of the secondary battery.
Figure 6:
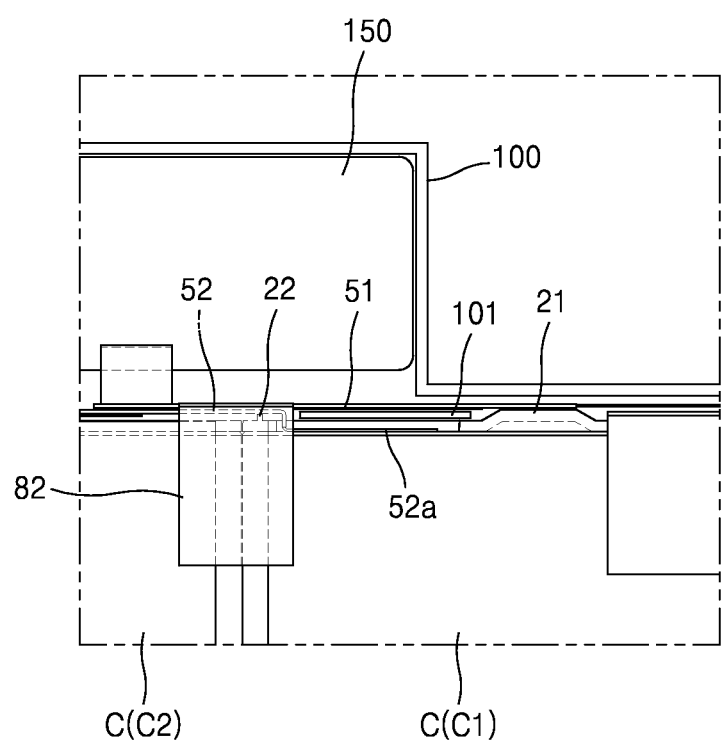
FIG. 6 is an enlarged view illustrating a region VI of FIG. 5.

FIG. 5 is a view illustrating an assembled state of the secondary battery. FIG. 6 is an enlarged view illustrating a region VI of FIG. 5.

Referring to FIGS. 5 and 6, the case 100 of the secondary battery accommodates the battery cell C. The assembling rib 101 can protrude from the case 100 toward the battery cell C. For example, the assembling rib 101 regulates an assembling position of the battery cell C. That is, the assembling rib 101 can restrict the battery cell C to a proper assembling position.

The assembling rib 101 of the case 100 is inserted in a space formed between the first and second protrusions 21 and 22. For example, the assembling rib 101 is inserted in a gap formed between the first connection member 51 and the cap cover 20 by the first and second protrusions 21 and 22.

The assembling rib 101 can be inserted in a space formed between the first connection member 51 and the leg 52a of the second connection member 52. The first connection member 51 is supported at an upper position from the cap cover 20 by the second protrusion 22, and the assembling rib 101 is inserted below the first connection member 51 lifted by the second protrusion 22.

The first connection member 51 extends from the temperature-sensing element 30 and crosses an upper portion of the cap cover 20 such that the first connection member 51 is suspended at an upper position between the first and second protrusions 21 and 22. In this state, the assembling rib 101 can be inserted in a space formed between the first and second protrusions 21 and 22 under the first connection member 51.

The connection members 51 and 52 can include conductive patterns (not shown) for forming current paths, and insulation coatings (not shown) for insulating the conductive patterns. In the exemplary embodiment, the connection members 51 and 52 refer to any members electrically connected to the battery cell C to form the charging and discharging current path. For example, the connection members 51 and 52 include tabs, coverlays, plates, terminals, etc.

As described above, according to at least one of the disclosed embodiments, owing to the protrusions 21 and 22, the connection members 51 and 52 electrically connected to the battery cell C are supported at upper positions separate from a surrounding structure, and thus the connection members 51 and 52 can be protected from physical damage. For example, the connection members 51 and 52 are protected from sharp shapes such as cutting edges, cutting burrs, or welding burrs of the temperature-sensing element 30 or the lead terminals 31 and 32.

It should be understood that the exemplary embodiments described herein should be considered in a descriptive sense only and not for purposes of limitation. Descriptions of features or aspects within each exemplary embodiment should typically be considered as available for other similar features or aspects in other exemplary embodiments.

While the inventive technology has been described with reference to the figures, it will be understood by those of ordinary skill in the art that various changes in form and details can be made therein without departing from the spirit and scope as defined by the following claims.

What is claimed is:
1. A secondary battery comprising:
   a battery cell including an electrode;
   a cap cover placed over the battery cell and having an opening that exposes the electrode, wherein the cap cover has a width defined in a direction of the thickness of the battery cell;
   a connection member placed over the cap cover and electrically connected to the electrode, wherein the connection member has a bottom surface facing the battery cell; and
   a protrusion having a width the same as that of the cap cover and extending upwardly from the cap cover and in direct physical contact with the bottom surface of the connection member, wherein the protrusion defines a gap between the cap cover and the bottom surface of the connection member,
wherein the protrusion has a top flat surface facing the connection member, wherein the bottom surface of the connection member includes a flat region, and wherein the top flat surface of the protrusion is in direct physical contact with the flat bottom region of the connection member, wherein the protrusion comprises at least first and second protrusions separated from each other in a length direction of the connection member,
wherein the connection member comprises first and second connection members overlapping each other in the height dimension of the secondary battery, and wherein a vertical gap is formed between the first and second connection members.

2. The secondary battery of claim 1, further comprising i) a case accommodating the battery cell, the cap cover, and the connection member and ii) an assembling rib protruding from the case and positioned between the first and second protrusions.

3. The secondary battery of claim 2, wherein the assembling rib is positioned in a space defined by the connection member, the cap cover and the first and second protrusions.

4. The secondary battery of claim 1, wherein the battery cell has an upper surface, and wherein the electrode comprises first and second electrodes formed over the upper surface of the battery cell and having different polarities.

5. The secondary battery of claim 4, wherein the first and second connection members are electrically connected to the first and second electrodes, respectively.

6. The secondary battery of claim 5, wherein the protrusion contacts at least one of the first and second connection members.

7. The secondary battery of claim 5, wherein the first and second connection members extend in the length direction of the cap cover.

8. The secondary battery of claim 5, wherein the opening comprises first and second openings that respectively expose the first and second electrodes.

9. The secondary battery of claim 8, wherein the cap cover has an end portion,
wherein the first protrusion is formed between the first and second openings, and
wherein the second protrusion is formed between the second opening and the end portion of the cap cover.

10. The secondary battery of claim 9, wherein the first protrusion contacts the first connection member electrically connected to the first electrode exposed through the first opening, and
wherein the second protrusion contacts the second connection member electrically connected to the second electrode exposed through the second opening.

11. The secondary battery of claim 10, wherein the second protrusion further supports a portion of the first connection member overlapping the second connection member.

12. The secondary battery of claim 11, further comprising i) a case accommodating the battery cell, the cap cover, and the connection member ii) an assembling rib protruding from the case positioned between the first and second protrusions.

13. The secondary battery of claim 12, wherein the assembling rib is positioned in a space defined by the first connection member, the cap cover and the first and second protrusions.

14. The secondary battery of claim 10, further comprising a temperature sensor placed between the first electrode and the first connection member, wherein the cap cover further comprises a third opening that exposes the temperature sensor.

15. The secondary battery of claim 9, wherein the first protrusion has a top portion and slanted sides that are inclined with respect to the top portion of the first protrusion and a top portion of the cap cover.

16. secondary battery comprising:
a battery cell including an electrode;
a cap cover placed over the battery cell and having an opening that exposes the electrode, wherein the cap cover has a width defined in a direction of the thickness of the battery cell, wherein the cap cover includes a body portion and a plurality of protrusions each having a width the same as that of the cap cover and protruding upwardly from the body portion, and wherein the protrusions include a first protrusion and a second protrusion longer than the first protrusion; and
a connection member placed over the cap cover and electrically connected to the electrode, wherein the connection member has a bottom surface facing the battery cell, and wherein the protrusions are in direct physical contact with the bottom surface of the connection member,
wherein each of the protrusions has a top flat surface facing the connection member, wherein the bottom surface of the connection member includes a flat region, and wherein the top flat surface of each protrusion is in direct physical contact with the flat bottom region of the connection member, wherein the connection member comprises first and second connection members overlapping each other in the height dimension of the secondary battery, and wherein a vertical gap is formed between the first and second connection members.

17. The secondary battery of claim 16, wherein the first and second protrusions define a gap between the cap cover and the bottom surface of the connection member.

18. The secondary battery of claim 16, wherein the battery cell includes two battery cells electrically connected to each other, and wherein the first and second connection members at least partially overlap each other.

19. The secondary battery of claim 1, wherein each of the first and second protrusions has a width defined in a direction of the thickness of the battery cell, and wherein the width of each protrusion is substantially the same as the thickness of the battery cell.

* * * * *